United States Patent [19]
Maisey et al.

[11] 3,877,890
[45] Apr. 15, 1975

[54] BIOCIDE

[75] Inventors: Roy Frederick Maisey, Alderley Park; Michael Singer, Manchester, both of England

[73] Assignee: Imperial Chemical Industries Limited, London, England

[22] Filed: Aug. 9, 1973

[21] Appl. No.: 386,877

[30] Foreign Application Priority Data
Aug. 11, 1972 United Kingdom.............. 37546/72

[52] U.S. Cl.................................... 44/76; 424/185
[51] Int. Cl.............................................. C10l 1/30
[58] Field of Search ................... 44/76, 77; 424/185

[56] References Cited
UNITED STATES PATENTS

| | | | |
|---|---|---|---|
| 2,104,021 | 1/1938 | Callis | 44/56 |
| 2,128,685 | 8/1938 | Yates | 44/56 |
| 2,975,042 | 3/1961 | Summers, Jr. | 44/56 |
| 3,523,014 | 8/1970 | De Gray | 44/76 |

FOREIGN PATENTS OR APPLICATIONS

| | | | |
|---|---|---|---|
| 722,538 | 1/1955 | United Kingdom | 424/185 |
| 836,660 | 8/1961 | France | 424/185 |

*Primary Examiner*—Daniel E. Wyman
*Assistant Examiner*—Y. H. Smith
*Attorney, Agent, or Firm*—Cushman, Darby & Cushman

[57] ABSTRACT

An organoboron composition comprising 4-hydroxymethyl-2-phenyl-2-bora-1,3-dioxacyclopentane and 5-hydroxy-2-phenyl-2-bora-1,3-dioxacyclohexane, its preparation and use as a biocide, particularly for controlling and preventing the growth of micro-organisms in aircraft fuel.

8 Claims, No Drawings

BIOCIDE

This invention relates to a method for the control of micro-organisms by the use of a biocide of an organoboron composition, to the composition per se and a process for its preparation.

According to the present invention there is provided a method for protecting a medium against infection by micro-organisms and for controlling and eradicating the growth of micro-organisms in a medium infected thereby, which comprises treating the medium with an effective amount of an organo-boron composition obtained by the reaction between approximately equimolecular quantities of glycerol and phenyl boron oxide with elimination of a molecule of water.

A composition is effective in preventing media from becoming infected by micro-organisms, and where infection has already occurred, in controlling the growth of the micro-organisms and freeing the media from infection; by 'an effective amount ' is meant an amount sufficient to achieve these results.

The organo-boron composition comprises, in admixture, 4-hydroxymethyl-2-phenyl-2-bora-1,3-dioxacyclopentane, having the structure I, and 5-hydroxy-2-phenyl-2-bora-1,3-dioxacyclohexane,

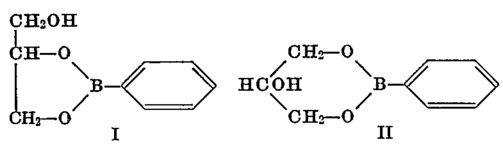

having the structure II. The former compound predominates, and analytical evidence, in particular from nuclear magnetic resonance spectroscopy, indicates that it may form from 80% to more than 95% by weight of the mixture. The relative proportion of compounds I and II varies with the reaction conditions during the process of preparation. Some measure of separation of the two compounds can be achieved by recrystallisation for example, from methanol. However, for the purposes of the present invention no separation of the components is necessary, the mixture being a satisfactory biocide when used as described herein.

Applications of the compound include its use as an antimicrobial agent in the preservation of hides, sheepskins, control of microbial growth in oils and oil emulsions, control of the growth of fungi on leather, paint and wood, control of the growth of fresh water and marine algae and the control of slime-forming organisms in industrial process waters such as in the water systems of paper mills.

However, the compound finds particular application in the control of microbiological contamination of hydrocarbons, and particularly aircraft fuel. The contamination of aircraft fuel by micro-organisms became a significant problem when military and commercial jet aircraft with integral fuel tanks began to operate in tropical areas. It is believed that *Cladosporium resinae*and *Pseudomonas sp.*, the organisms most often encountered in wing tanks, are responsible for filter blockage and corrosion damage to the structural metal. Aircraft fuel always contains a certain amount of water, and micro-organisms flourish at the fuel-water interface. This problem occurs in storage tanks as well as in the aircraft fuel tanks themselves. Previously, in order to suppress the growth of micro-organisms certain compounds have been added to the aircraft fuel. One such compound is ethylene glycol monomethyl ether (EGME), added to the fuel to provide a concentration of 0.15to 0.20% by weight. This additive is moderately effective on its own, but in some instances it has been supplemented by addition of certain organic boron compounds or mixtures of of compounds, preferably as intermittent or shock doses. The mixture of organoboron compounds I and II has been found to be a very effective agent for controlling the growth of micro-organisms in aircraft fuel. It will normally be used for shock dosing of fuel already containing EGME as described above, but its use is not limited to this method of treatment. The compound can be employed as sole biocidal agent.

The mixture of organoboron compounds I and Ii may be added to aircraft fuel to provide a concentration from 25 to 1000 parts per million (ppm) by weight. In general, however, a concentration of approximately 100 ppm is found to be effective.

The invention is illustrated but not limited by the following Examples in which parts and percentages are by weight unless otherwise stated, the relationship between parts by weight and parts by volume being that between the kilogram and the litre.

EXAMPLE 1

Preparation of the organoboron composition 13.2 parts of glycerol, 15.1 parts of phenyl boron oxide and 60 parts by volume of benzene are heated together under reflux for 4 hours. 3.6 parts by volume of water are removed from the reaction-mixture during this time by azeotropic distillation. The benzene is then removed by evaporation under reduced pressure and the viscous liquid residue is dissolved in cold methanol and the product is caused to crystallise by cooling the solution with solid carbon dioxide/methanol. The product is recrystallised from methanol with solid carbon dioxide cooling and has a melting point of 60°–62°C.

EXAMPLE 2

Testing of the organoboron composition for biocidal activity in aircraft fuel

The following test method was used:

Nylon meshes 1 cm square are autoclaved at 15 lb/sq. in. in water, transferred on to malt agar plates, dried, and seeded with a standardised suspension of *Cladosporium resinae* (this being the most important of the organisms which infect aircraft fuel). The plates are incubated for 2 days at 25°C at which stage the nylon meshes are covered with mycebial growth although few or no spores are present.

Six of the above-mentioned fungus-impregnated squares are transferred into 20 ml. of Bushnell-Haas medium (carbon-free mineral salts solution) in a 3-litre conical flask. The Bushnell-Haas medium is then overlaid with 2 litres of jet fuel containing 0.2 g. of the organoboron composition (100 ppm) added as a solution in 1–2 ml. of EGME. The controls consisted of the same quantities of jet fuel containing 150 ppm and 10,000 ppm of EGME and 5000 ppm of Biobor JF (a commercially available boron-containing biocide) respectively.

Two nylon meshes were withdrawn from the aqueous layer after 1 day, 2 days and 5 days of incubation at room temperature. Each nylon mesh was tranferred to a sterile bottle containing 10 ml. of water, shaken vigorously for 5 minutes and then placed on a malt agar plate which was incubated for 5 days at 25°C.

The efficiency of the various compounds is estimated according to the time required to kill the *Cladosporium mycelium* when the supporting nylon mesh is adjacent to jet fuel containing the test chemical (i.e. when there is no subsequent fungal growth from the nylon mesh on transfer from the Bushnell-Haas medium to the malt agar plate).

The following results were obtained:

| Additive | Concentration in jet fuel (ppm) | Contact time of biocide-treated fuel with aqueous layer required for total kill of *Cladosporium* |
|---|---|---|
| Biobor JF | 5000 | 2 days |
| EGME | 1500 | >5 days |
| EGME | 10000 | >1 day |
| Organoboron Composition | 100 | 1 day |

We claim:

1. A method for protecting a [medium against ]hydrocarbon subject to infection by micro-organisms which comprises contacting the hydrocarbon with an effective amount of an organoboron composition obtained by the reaction between approximately equimolecular quantities of glycerol and phenyl boron oxide with elimination of a molecule of water.

2. A method as claimed in claim 1 wherein the hydrocarbon is aircraft fuel containing water.

3. A method as claimed in claim 2 wherein ethylene glycol monomethyl ether is additionally used with the organoboron composition in a concentration of 0.15–0.20% by weight based on the weight of the hydrocarbon.

4. A method as claimed in claim 3 wherein the ethylene glycol monomethyl ether is initially added to the aircraft fuel and the organoboron composition is thereafter added in intermittent doses to said aircraft fuel containing the ethylene glycol monomethyl ether.

5. A method as claimed in claim 2 wherein the organoboron composition is used in an amount of 25 to 1000 parts per million by weight based on the weight of hydrocarbon.

6. A method as claimed in claim 5 wherein the amount of organoboron composition is 100 parts per million by weight.

7. An organoboron composition comprising in admixture 4-hydroxymethyl-2-phenyl-2-bora-1,3-dioxacyclopentane and 5-hydroxy-2-phenyl-2-bora-1,3-dioxacyclohexane.

8. A hydrocarbon contaminated by water and consequently subject to infection by micro-organisms, said composition including from 25 to 1000 parts per million by weight of an organo-boron composition obtained by the reaction between approximately equimolecular quantities of glycerol and phenyl boron oxide with elimination of a molecular water, as protection against infection by micro-organisms or for the control of such infection when already present.

* * * * *